(12) United States Patent
Campbell et al.

(10) Patent No.: US 10,418,685 B1
(45) Date of Patent: Sep. 17, 2019

(54) FLEXED PERIMETER ROLLER ANTENNA POSITIONER

(71) Applicant: L3 Technologies Inc., New York, NY (US)

(72) Inventors: Jared E. Campbell, Salt Lake City, UT (US); Matthew Bare, Provo, UT (US); Walter Coe, Springville, UT (US); Charles Paul Curtis, Provo, UT (US); Michael Patrick Walton, Provo, UT (US); Cameron Schmidt, Provo, UT (US); Bryce Anderson, Pleasant Grove, UT (US); Jeffrey Allen, Provo, UT (US)

(73) Assignee: L3 Technologies, Inc., New York, NY (US)

( * ) Notice: Subject to any disclaimer, the term of this patent is extended or adjusted under 35 U.S.C. 154(b) by 88 days.

(21) Appl. No.: 15/476,539

(22) Filed: Mar. 31, 2017

Related U.S. Application Data

(60) Provisional application No. 62/316,212, filed on Mar. 31, 2016.

(51) Int. Cl.
*H01Q 3/08* (2006.01)
*H01Q 1/20* (2006.01)
*F16M 13/02* (2006.01)
*H01Q 3/10* (2006.01)

(52) U.S. Cl.
CPC .............. *H01Q 1/20* (2013.01); *F16M 13/02* (2013.01); *H01Q 3/10* (2013.01)

(58) Field of Classification Search
CPC ............. H01Q 1/125; H01Q 3/08; H01Q 3/10

USPC .......................................................... 138/120
See application file for complete search history.

(56) References Cited

U.S. PATENT DOCUMENTS

| | | | | |
|---|---|---|---|---|
| 3,052,107 A | * | 9/1962 | Kempf | F16F 15/10 464/180 |
| 5,178,129 A | * | 1/1993 | Chikama | A61B 1/0051 138/120 |
| 5,432,524 A | * | 7/1995 | Sydor | H01Q 1/3275 343/765 |
| 5,619,215 A | * | 4/1997 | Sydor | H01Q 3/08 343/765 |
| 6,002,376 A | * | 12/1999 | Chiba | H01Q 3/06 343/765 |

(Continued)

*Primary Examiner* — Bradley Duckworth
(74) *Attorney, Agent, or Firm* — Workman Nydegger

(57) ABSTRACT

One embodiment disclosed herein is related to a device for pointing a radiating element. The device includes an aligned radiating surface; a hinge that is circumferentially mounted to a rear side of the aligned radiating surface, the hinge configured to change azimuth of the aligned radiating surface; and a Tubular Universal joint (TU-joint) having one end coupled to a rear side of the aligned radiating surface and a second end coupled to a base, the TU-joint being configured to change an elevation of the aligned radiating surface. Another embodiment is related to a Tubular Universal-joint (TU-joint). In the embodiment, the TU-joint includes a hollow tube having a first end and a second end; a plurality of slits along the surface of the tube; and a plurality of members between the plurality of slits, each of the plurality of members configured to bear a portion of a load of the TU-joint, wherein the TU-joint is configured to be axially and torsionally stiff while being bendable.

20 Claims, 7 Drawing Sheets

(56) References Cited

U.S. PATENT DOCUMENTS

| | | | | |
|---|---|---|---|---|
| 6,408,889 B1* | 6/2002 | Komachi | ............. | A61B 1/0055 |
| | | | | 138/120 |
| 6,911,950 B2* | 6/2005 | Harron | ..................... | H01Q 3/08 |
| | | | | 343/765 |
| 7,045,705 B2* | 5/2006 | Ikeda | ................... | H02G 11/006 |
| | | | | 174/21 R |
| 7,218,289 B2* | 5/2007 | Trajkovic | ................. | H01Q 3/08 |
| | | | | 343/757 |
| 7,559,340 B2* | 7/2009 | Ikeda | ..................... | F16G 13/16 |
| | | | | 138/108 |
| 8,059,048 B2* | 11/2011 | Felstead | ................. | H01Q 19/13 |
| | | | | 343/766 |
| 8,327,518 B2* | 12/2012 | Korner | ................. | A61B 1/0055 |
| | | | | 138/120 |
| 8,638,264 B2* | 1/2014 | Hall | ..................... | H01Q 21/061 |
| | | | | 343/757 |
| 10,079,423 B2* | 9/2018 | Asrokin | ............... | H01Q 1/1228 |
| 2012/0001816 A1* | 1/2012 | Blaney | .................. | H01Q 25/00 |
| | | | | 343/765 |
| 2014/0166843 A1* | 6/2014 | Bertocchi | ............... | H01Q 3/08 |
| | | | | 248/550 |
| 2018/0131072 A1* | 5/2018 | Hataya | .................... | H01Q 1/12 |

* cited by examiner

FLEXED PERIMETER ROLLER ANTENNA POSITIONER

CROSS-REFERENCE TO RELATED APPLICATIONS

This application claims priority to and the benefit of U.S. Provisional Patent Application No. 62/316,212, filed on Mar. 31, 2016, entitled "Flexed Perimeter Roller Antenna Positioner," which application is incorporated by reference herein in its entirety.

BACKGROUND

Directional antennas are a critical part of a data-link. The most common pointing mechanism for directional antennas is an elevation over azimuth design. An important function of these pointing mechanisms is to point the boresight axis of the antenna accurately at a known receiving target. In other words, the antenna is pointed to specific elevation and azimuth angles and the pointing mechanisms facilitates the required movement.

A problem faced by the conventional pointing mechanisms is that they are required to spin in azimuth to achieve the needed azimuth angles. This prevents the use of electrical cables for electrical and RF connectivity in azimuth. In elevation, which is typically used over a discrete amount of angles, electrical cables may be used for electrical and RF connectivity. However, the movement in elevation may damage the electrical cables used for electrical and RF connectivity in elevation.

Current designs often utilize a mechanism called a slip ring which maintains electrical and RF connectivity across a rotating joint to achieve full azimuth and elevation movement. That is, the slip ring allows the transmission of power and electrical signals from a stationary to a rotating structure. Typically, a slip ring consists of a stationary graphite or metal contact (brush) which rubs on the outside diameter of a rotating metal ring. As the metal ring turns, the electric current or signal is conducted through the stationary brush to the metal ring making the connection. However, slip rings are expensive and difficult to implement and so may not be ideal for many applications.

An alternative to a slip ring is a Canfield Joint. The Canfield Joint is a mechanism that allows for full hemispherical motion from whatever connects to it. Typically, the joint is implemented using a cage-like design that makes use of appropriate actuators for movement. Although often seen as an improvement over a slip ring, the Canfield Joint is complex and bulky and so may not be ideal for many applications.

The subject matter claimed herein is not limited to embodiments that solve any disadvantages or that operate only in environments such as those described above. Rather, this background is only provided to illustrate one exemplary technology area where some embodiments described herein may be practiced. Unless otherwise indicated herein, the materials described in this section are not prior art to the claims in this application and are not admitted to be prior art by inclusion in this section.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One embodiment disclosed herein is related to a device for pointing a radiating element. The device includes an aligned radiating aperture; a hinge that is circumferentially mounted to a rear side of the aligned radiating surface, the hinge configured to change the elevation angle of the aligned radiating surface; and a Tubular Universal-joint (TU-joint) having one end coupled to a rear side of the aligned radiating surface and a second end coupled to a base, the TU-joint being configured to change an elevation of the aligned radiating surface.

Another embodiment is related to a Tubular Universal joint (TU-joint). In the embodiment, the TU-joint includes a hollow tube having a first end and a second end; a plurality of slits along the surface of the tube; and a plurality of members between the plurality of slits, each of the plurality of members configured to bear a portion of a load of the TU-joint, wherein the TU-joint is configured to be axially and torsionally stiff while being bendable.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The Flexed Perimeter Roller (FPR) is a device that allows for accurate alignment of a normal vector (for some "aligned surface") in a wide range of directions while also facilitating a cabled electrical connection between a stationary base and the aligned surface. The FPR maintains the standard gimbal degrees of freedom: elevation and azimuth. Advantageously, the FPR is able to maintain a negative "look-angle" in elevation with the possibility of continuous azimuth rotation, without the need of a sliding contact or slip-ring within the electrical connection assembly. This is possible, in at least some embodiments, by clocking the aligned surface and the stationary surface in azimuth with a unit ratio. In such embodiments, this is made possible by a Free Clocking Mechanism (FCM) which allows the aligned surface to rotate about its aligned axis as the axis azimuth angle changes as will be described in more detail to follow.

To drive this rotation, in some embodiments a Tubular Universal joint (TU-joint) may be implemented to be stiff in torsion about the aligned axis, stiff in compression and tension along the aligned axis, and facilitates bending normal to the aligned axis. The TU-joint, in some embodiments, is rigidly connected to the center of the aligned surface and torsionally aligned with the stationary base while passing through a hole in the center of the base. The TU joint may also provide the structure for elevation control. The ability to bend normal to the aligned axis allows the tube to create an arc. The aligned surface may be hinged to allow elevation freedom. In some embodiments, by changing the length of the TU-joint between the stationary base and the aligned surface, the axial stiffness of the TU-joint forces a change in the elevation angle of the aligned surface and the TU-joint forms an arc between the aligned surface and the stationary base. There are several methods to change the length of the TU joint between the aligned surface and the stationary base, all of which may drive the tube through the base and change the percentage of TU-joint length that is above and below the base.

Figure 1:
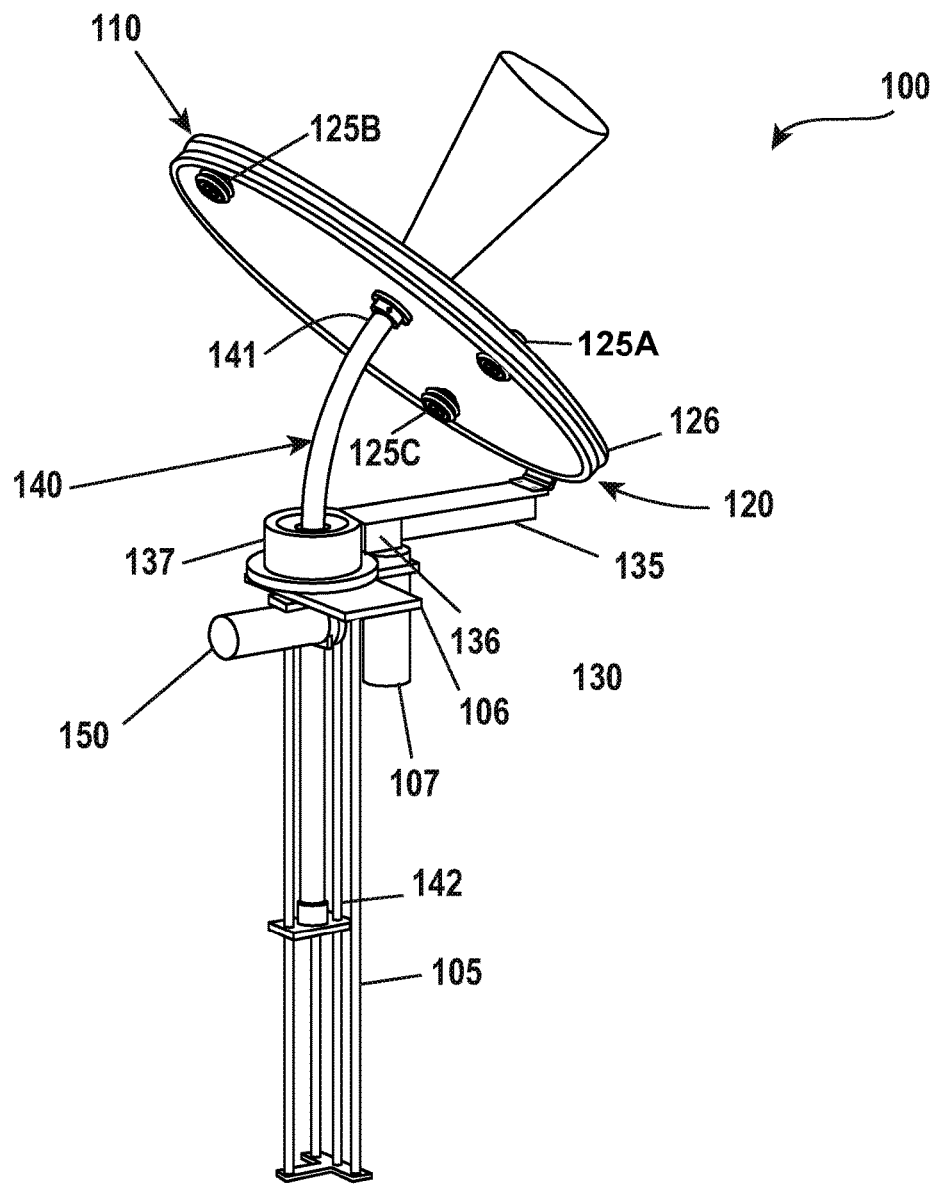
FIG. 1 illustrates a Flexed Perimeter Roller (FPR) in accordance with the embodiments disclosed herein.
Figure 1A:
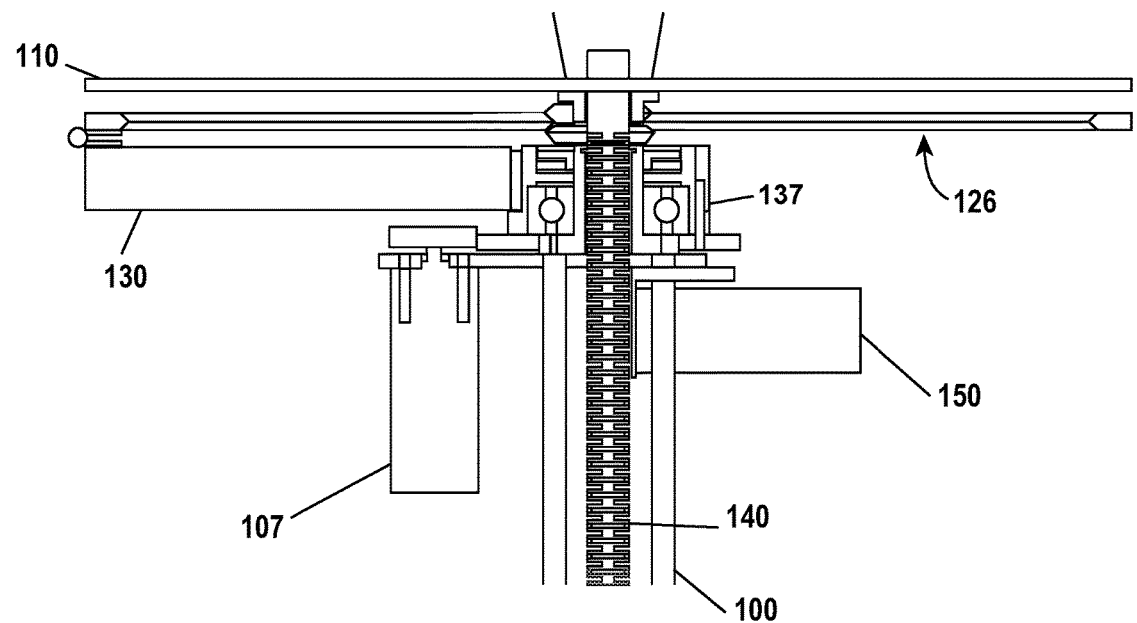
FIG. 1A illustrates a cross-section of the FPR of FIG. 1.

FIG. 1 illustrates a Flexed Perimeter Roller (FPR) 100 in accordance with one embodiment of the present invention. It will be appreciated after reading this description that the embodiment 100 is only one of many different ways that the present invention may be implemented. Accordingly, the description of the FPR 100 is not to be limiting, but is meant to be an illustrative example only. FIG. 1A shows a cross section of FIG. 1 and so will not be separately described.

As shown in FIG. 1, the FPR 100 includes an aligned radiating aperture 110, which may be constructed of any reasonable material suitable for a radiating antenna surface. Accordingly the embodiments disclosed herein are not limited by the type of aligned radiating surface 110.

In addition The FPR 100 also includes a base 105. The base 105 may be constructed of any reasonable material suitable for supporting the various elements of the FPR 100. In some embodiments, the base 105 may be connected to other structures when the FPR 100 is implemented as part of a larger system. Accordingly the embodiments disclosed herein are not limited by the type of base 105.

The FPR also includes a Free Clocking Mechanism (FCM) 120. The FCM 120 allows for rotation of the aligned radiating surface 110 about an aligned axis, while also allowing for elevation motion through a circumferentially mounted hinge. In the illustrated embodiment, this is achieved through a circumferential roller system with wheels 125a, 125b, and 125c, mounted to the aligned surface 110, rolling along the inner circumference of a hinged ring 126. Although three wheels 125a-125c are illustrated, it will be appreciated that more or less than this number may be implemented. FIG. 1 further illustrates an azimuth control 130 that comprises a mechanical arm 135 that is connected to the hinged ring 126.

Figure 5:
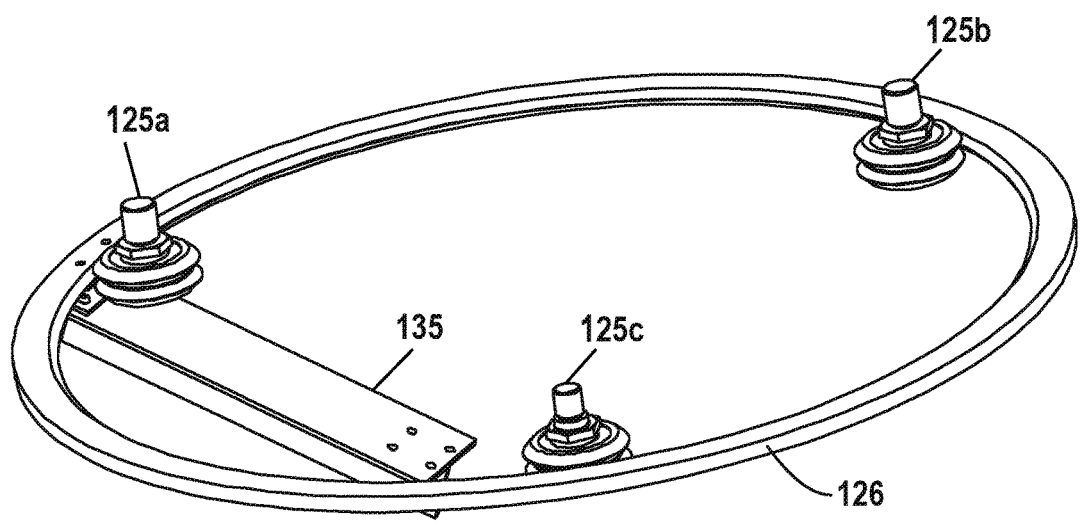
FIG. 5 illustrates a Free Clocking Mechanism (FCM) in accordance with the embodiments disclosed herein.

FIG. 5 shows a more detailed view of the FCM 120 and the azimuth control 130. As illustrated, the wheels 125a-125c are mounted on the inner circumference of the ring 126. Further, the mechanical arm 135 is connected to a surface of the ring 126. This allows the mechanical arm 135 to control the movement of the ring 126 via the wheels 125a-125c to thereby control the rotation of the aligned radiating surface 110 about an aligned axis. Said another way, the combination of the mechanical arm 135 and the wheels 125a-125c allow for full rotation and tilt of the aligned surface 110.

Figure 6:
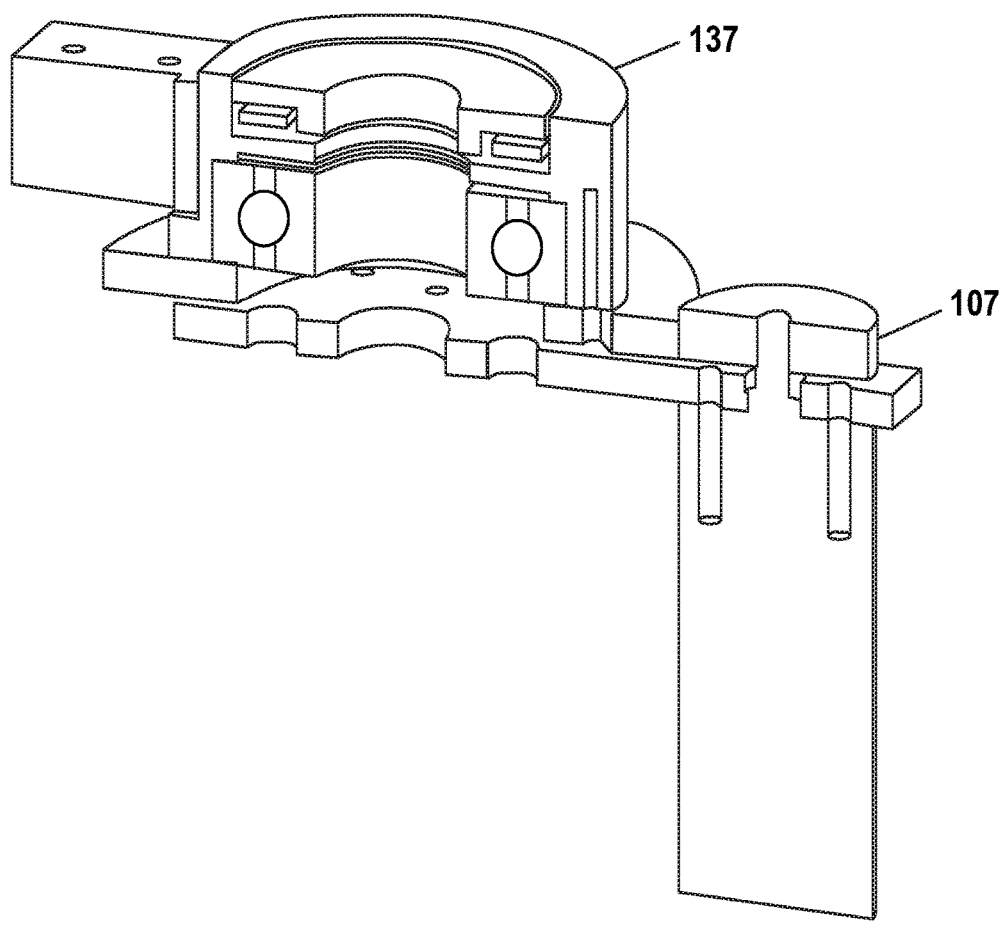
FIG. 6 illustrates a bearing assembly in accordance with the embodiments disclosed herein.

The mechanical arm 135 is connected to a base plate 136 through a bearing assembly 137, which is further illustrated in FIG. 6. The bearing assembly 137 allows the mechanical arm 135 to rotate continuously in azimuth. A gear train (not illustrated) and motor 107 of the bearing assembly allow for this azimuth rotation to be controlled.

The FPR 100 further includes a Tubular Universal joint (TU-joint) 140. The TU-joint 140 may be a metal tube with enhanced bending flexibility. The TU-joint 140 may be designed to hold a column load as well as a torsional load with a high degree of stiffness. In other words, TU-joint 140 is stiff axially and torsionally, but is able bend. Thus, the TU-joint 140 is bendable, but not twistable.

The TU-joint 140 is produced by introducing a series of slits 146 into a tube 145. A series of small members 147 remain between each of the slits. Each small member 147 carries a portion of the load in bending and torsion. As shown in FIG. 1, a first end 141 of the TU-joint 140 is coupled to the aligned radiating surface 110 and a second end 142 is coupled to base 105.

Although the second end 142 is shown as extending in a straight manner into the base 105, this need not be the case. In an alternative embodiment, the end 142 may be implemented as a coil. Advantageously, coiling the end 142 allows for space to be saved in the base 105.

Figure 2:
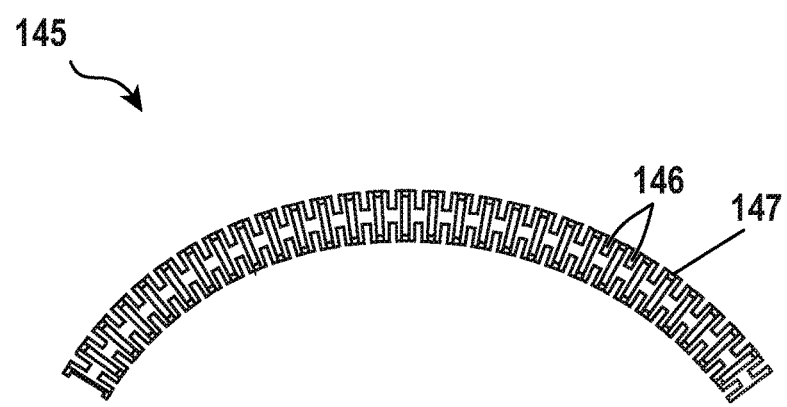
FIG. 2 illustrates a first view of a Tubular Universal-joint (TU-joint) in accordance with the embodiments disclosed herein.
Figure 3:
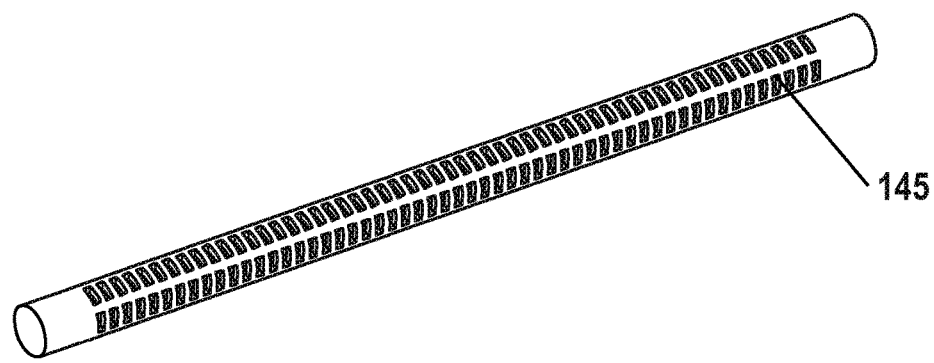
FIG. 3 illustrates an alternative view of the TU-joint in accordance with the embodiments disclosed herein.
Figure 4:
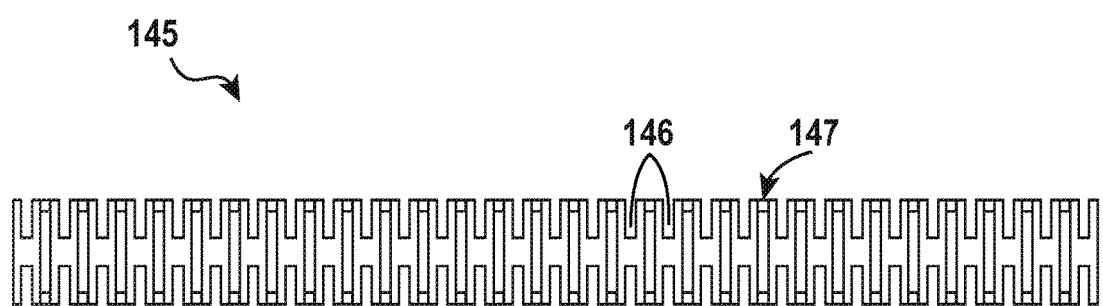
FIG. 4 illustrates an alternative view of the TU-joint in accordance with the embodiments disclosed herein.

FIGS. 2-4 show alternative views of the TU-joint 140. As shown in these figures, the tube 145 includes a number of the slits 146 and small members 147. These slits 146 allow the tube 145 to bend as shown in FIG. 2. The ability to bend normal to the aligned axis allows the tube 145 to create an arc. In some embodiments, the tube is able to bend up to a pre-determined radius, beyond which it becomes stiff and yet provide high axial and torsional stiffness.

In one embodiment, the TU-joint 140 may have an outer diameter of 0.5 inches and an inner diameter of 0.4 inches. The TU-joint 140 may be 11 inches long and include 68 joint elements. Of course, it will be appreciated that this is only one example of the TU-joint 140 and that the joint may be implemented with other dimensions as circumstances warrant. Accordingly, the embodiments disclosed herein are not limited to any specific dimensions of the TU-joint 140.

Figure 7:
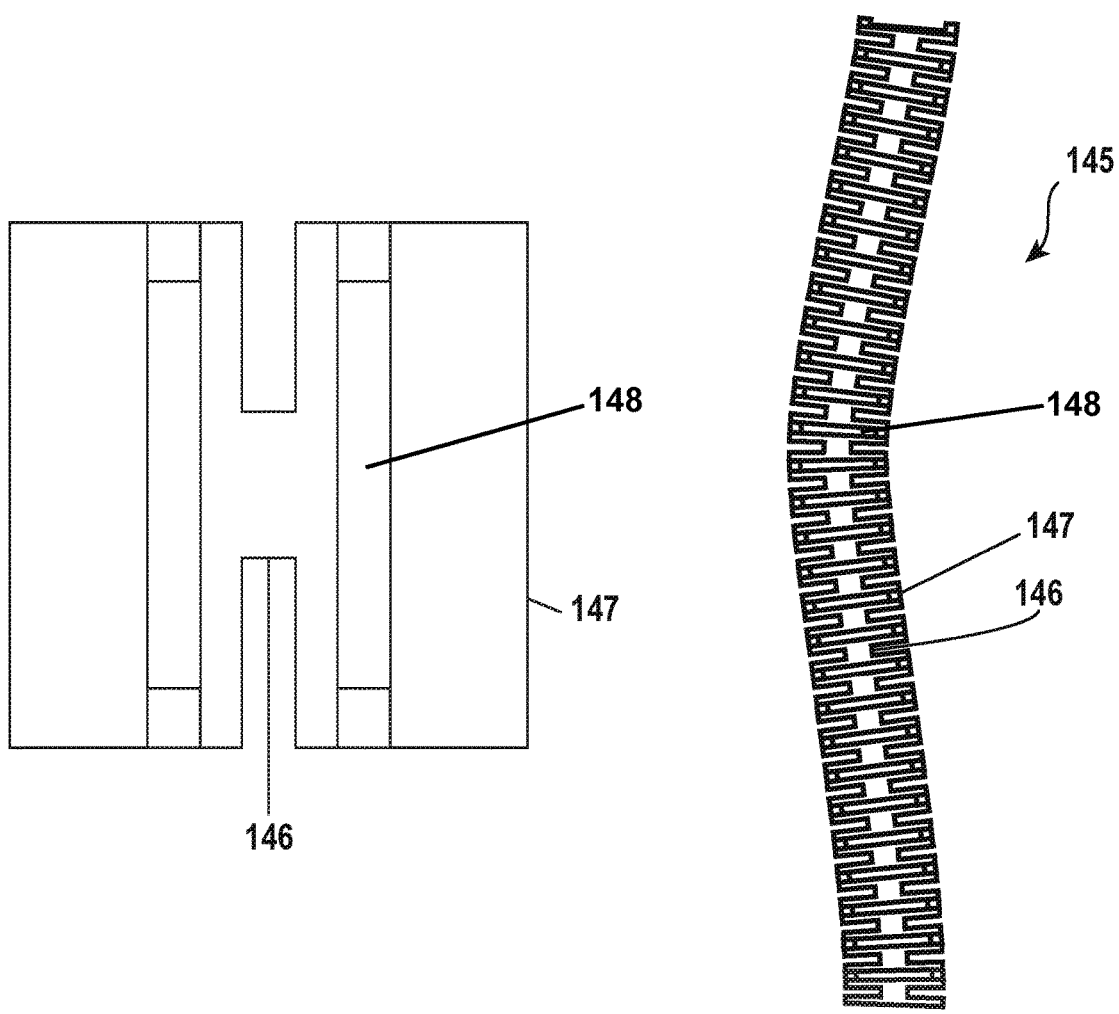
FIG. 7 illustrates a close up view of the slits and the small members of the TU-joint in accordance with the embodiments disclosed herein.

FIG. 7 shows a close up view of the slits 146 and the small members 147. As illustrated, the slits 146 separate the small members 147 from each other and allow the TU-joint 140 to bend. As further illustrated, the small members 147 include a hollow middle portion 148.

As shown in FIGS. 1, 1A, and 6, the bearing assembly 137 includes a hollow hole through which TU-joint 140 is inserted. This allows for a change in the length of the TU joint 140 between the base 105 and the aligned radiating surface 110, which in turn allows the TU-joint 140 to change the elevation angle of the aligned radiating surface 110.

In some embodiments, the tube 145 may have a hollow surface. This advantageously allows the tube to act as a conduit for electrical cabling and other electrical connectors (not illustrated) that are needed by radiating elements and other electronics of the antenna system. In other words, the hollow nature of the tube 145 allows the electrical cabling to be directly fed to any electronics that are implemented on the aligned surface 110. That is, the electrical cabling may be fed from the end 142 to the end 141. Since the TU-joint 140 is not able to twist, no damage is done to the cabling while the FPR 100 is in operation. Advantageously, this removes the need for slip-rings, Canfield joints, or the like when attaching the electrical cabling.

As mentioned above, to change the elevation angle of the aligned radiating surface 110, the length of TU-joint 140 between the aligned radiating surface 110 and base 105 should change. In one embodiment an arm pivots from beneath a base plate 106 at an offset equal to the radius of a distal plate. This pivot is driven by a motor 150 that rotates the arm. The TU joint 140 is fixed to the end of this arm, so that the rotating arm pushes the TU-Joint 140 through the base. Alternatively, a friction drive wheel can be positioned directly above the base plate to force the TU-joint to be more or less between aligned surface radiating surface 110 and the base. In those embodiments where the tube 145 of the TU-joint 140 is coiled in the base 105, the TU-joint 140 may be coiled and uncoiled as the length of TU-joint 140 between the aligned radiating surface 110 and base 105 changes.

In another embodiment which is not illustrated, the TU joint 140 can be attached, at the end opposite the aligned radiating surface 110, to a plate. The distance between this plate and the base 105 can be changed to force the TU joint 140 to be more or less between aligned radiating surface 110 and the base. The plate need not be parallel to the stationary base, but can be hinged at some distance which allows for more compact storage.

In operation, the first end 141 of the TU-joint 140 is able to bend as the aligned surface 110 is rotated around the full hemisphere. However, as previously described, little or no stress is placed on any electrical cabling or other electrical connections that are inside of the TU joint 140 since the TU joint does not twist. Accordingly, the TU joint provides for full hemisphere tracking with at most two motors, the motor 107 for azimuth control and the motor 150 for elevation control. Thus, the FPR 100 is able to be implemented with less parts than typical systems.

The embodiments of the present invention disclosed herein provide many advantages over existing systems. One non-limiting advantage offers an alternative to 1) the traditional elevation over azimuth gimbal arrangement and 2) the spatial, parallel-architecture robotic carpal wrist design, aka. Canfield Joint. The embodiments of the present invention disclosed herein eliminate the need for slip-rings and rotary joints, components that are found in nearly every gimbal antenna system and add significant cost, lead-times, and weight. The resulting reliability of a system using slip-rings and rotary joints is negatively impacted due to the complexity of the moving parts and use of contacting/sliding internal components. Rather than requiring critical electrical components to possess rotational motion, embodiments of the present invention disclosed herein shifts the items required to rotate to basic passive rolling and hinging components, thus greatly reducing cost and complexity of the system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A device for pointing a radiating element, the device comprising:
    an aligned radiating surface;
    a hinged ring that is circumferentially mounted to a rear side of the aligned radiating surface, the hinged ring configured to change azimuth of the aligned radiating surface; and
    a tubular joint member comprising a tube with a plurality of slits introduced into the surface of the tube having one end coupled to a rear side of the aligned radiating surface and a second end coupled to a base that is configured to support the aligned radiating surface and the hinged ring, the tubular joint member being configured to change an elevation of the aligned radiating surface, the tubular joint member being configured to be axially and torsionally stiff while being bendable such that the tubular joint member is bendable, but not twistable.

2. The device of claim 1, wherein the tubular joint member changes the elevation by allowing a length of the tubular joint member between the aligned radiating surface and the base to be changed.

3. The device of claim 2, wherein the change in the length of the tubular joint member is driven by a motor.

4. The device of claim 1, wherein the hinged ring changes azimuth by allowing rotation of the aligned radiating surface about an aligned axis.

5. The device of claim 1, wherein the hinged ring comprises a circumferential roller system including a plurality of wheels that roll along the inner circumference of the hinged ring.

6. The device of claim 5, wherein the plurality of wheels comprises three wheels.

7. The device of claim 1, wherein the tubular joint member includes a plurality of members between the plurality of slits, each of the plurality of members configured to bear a portion of a load of the tubular joint member.

8. The device of claim 1, wherein the tube is hollow such that the tube is able to act as a conduit for electrical cabling or electrical connectors.

9. The device of claim 1, wherein the tubular joint member provides for full hemisphere tracking with at most two motors.

10. The device of claim 1, further comprising a support arm between the hinged ring and the base.

11. The device of claim 10, wherein the support arm causes the hinged ring to rotate when driven by a motor.

12. A Flex Perimeter Roller (FPR) for pointing a radiating element, the FPR comprising:
    an aligned radiating aperture;
    a Free Clocking Mechanism (FCM) including a hinged ring that is circumferentially mounted to a rearside of the aligned radiating aperture, the hinged ring configured to change azimuth of the aligned radiating aperture;
    a base that is configured to support the aligned radiating aperture and the FCM; and
    a tubular joint member comprising a tube with a plurality of slits introduced into the surface of the tube having one end coupled to a rear side of the aligned radiating aperture and a second end coupled to the base, the tubular joint member being configured to change an elevation of the aligned radiating aperture, the tubular joint member being configured to be axially and torsionally stiff while being bendable such that the tubular joint member is bendable, but not twistable.

13. The FPR of claim 12, wherein the hinged ring changes azimuth by allowing rotation of the aligned radiating aperture about an aligned axis.

14. The FPR of claim 12, wherein the hinged ring comprises a circumferential roller system including a plurality of wheels that roll along the inner circumference of the hinged ring.

15. The FPR of claim 12, wherein the tubular joint member changes the elevation by allowing a length of the tubular joint member between the aligned radiating surface and the base to be changed.

16. The FPR of claim 12, wherein the tube is hollow such that the tube is able to act as a conduit for electrical cabling or electrical connectors.

17. The FPR of claim 12, wherein the tubular joint member includes a plurality of members between the plurality of slits, each of the plurality of members configured to bear a portion of a load of the tubular joint member.

18. A Flex Perimeter Roller (FPR) for pointing a radiating element, the FPR comprising:
   an aligned radiating aperture;
   a Free Clocking Mechanism (FCM) including a hinged ring that is circumferentially mounted to a rearside of the aligned radiating aperture, the hinged ring comprising a circumferential roller system including a plurality of wheels that roll along the inner circumference of the hinged ring;
   an azimuth control unit comprising a mechanical arm connected to an inner surface of the hinged ring to thereby change azimuth of the aligned radiating aperture;
   a base that is configured to support the aligned radiating a perture and the FCM; and
   a tubular joint member comprising a tube with a plurality of slits introduced into the surface of the tube having one end coupled to a rear side of the aligned radiating aperture and a second end coupled to the base, the tubular joint member being configured to change an elevation of the aligned radiating aperture, the tubular joint member being configured to be axially and torsionally stiff while being bendable such that the tubular joint member is bendable, but not twistable.

19. The FPR of claim 18, wherein the tubular joint member changes the elevation by allowing a length of the tubular joint member between the aligned radiating surface and the base to be changed.

20. The FPR of claim 18, wherein the tubular joint member includes a plurality of members between the plurality of slits, each of the plurality of members configured to bear a portion of a load of the tubular joint member.

* * * * *